Patented Sept. 20, 1949

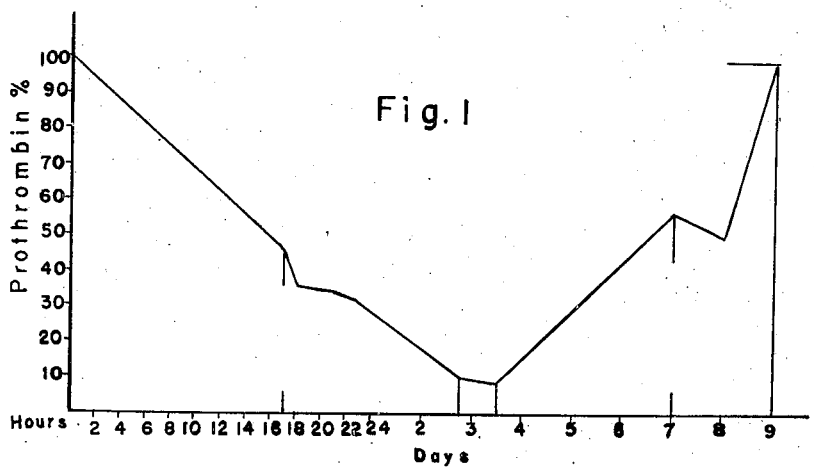
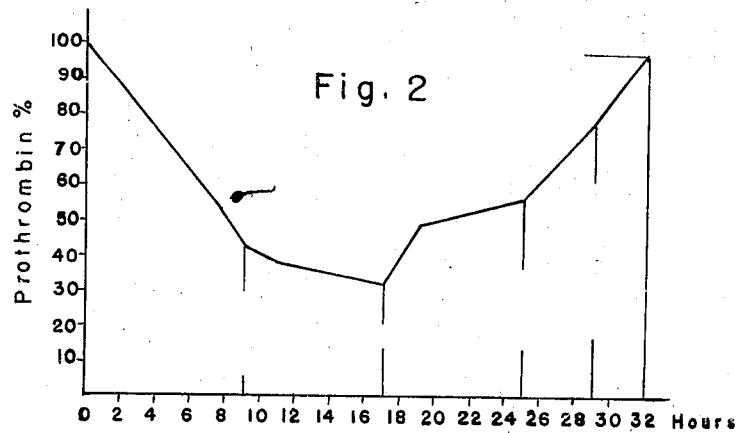

2,482,510

UNITED STATES PATENT OFFICE 2,482,510

DERIVATIVES OF THE BENZOTETRONIC ACID AND PROCESSES FOR MANUFACTURING SAME

Jan Rosický, Prague, Czechoslovakia, assignor to Spojene farmaceuticke zavody, narodni podnik, Prague, Czechoslovakia Application February 14, 1947, Serial No. 728,714
In Germany March 18, 1944

Section 1, Public Law 690, August 8, 1946
Patent expires March 18, 1964

4 Claims. (Cl. 260—344.6)

1

The invention is concerned with the manufacture of derivatives of the benzotetronic acid and more particularly of derivatives which are valuable for the control of the prothrombin level of the blood.

It is known that 3,3'-methylenebis-(4-hydroxycoumarin) when administered internally will greatly reduce the coagulability of the blood and extend the time of coagulation.

Animal tests have proved that the duration of the effect of this compound is very prolonged. Thus, for instance, after a single dose of 5 milligrams per kilogram administered to a rabbit, the minimum level of the prothrombin drop will be reached within approximately two days, is held for two to three days and only on the sixth to seventh day the return to normal will start, as shown on Fig. 1 of the accompanying drawings which will be described more in detail hereinafter.

This slow return to normal of the prothrombin level is, in many cases, of great disadvantage for a clinical application of this known method, since, even if desired, an interruption of this condition is impossible. Even the administration of high doses of vitamin K cannot cause the return to normal of the prothrombin level.

A primary object of this invention therefore is the manufacture of a preparation the effect of which starts more rapidly and decreases more rapidly, thus makes possible to interrupt, if desired, the effect on the prothrombin level or to extend this effect by a renewed administration of the dose.

A novel compound highly effective for the control of the prothrombin level is obtained when, in accordance with my invention, benzotetronic acid or 4-hydroxycoumarin is condensed with glyoxylic acid ethyl ester. The condensation may be carried out at elevated temperature in the presence of a solvent, e. g. in water at boiling temperature.

The reaction product, for instance of the reaction between benzotetronic acid and glyoxylic acid ethyl ester, will remain unchanged when heated with alcoholic potassium. When heated to 230° C., carbon dioxide will escape and the residue will melt not below 300° C., which is conclusive of the fact that condensation had taken place.

2

The reaction between two molecules of benzotetronic acid and one molecule of glyoxylic acid ethyl ester is as follows:

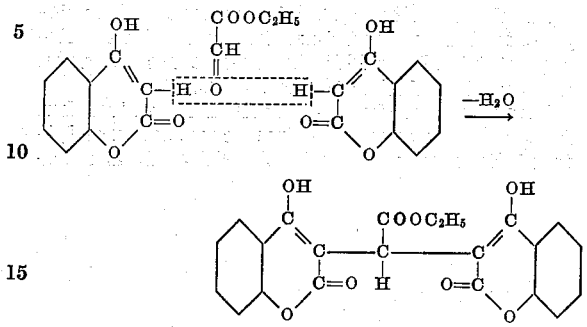

This condensation product may be considered as 3,3'-carboxymethylenebis-(4-hydroxycoumarin) ethyl ester.

An interesting phenomenon was observed when the melting point was determined. The product as first obtained melts at 172 to 174° C. When the product is recrystallized from dilute acetic acid, this melting point remains unchanged; if crystallized from methyl alcohol, the melting point decreases to 153 to 154° C.

This product of lower melting point may be reconverted by recrystallization into the product of higher melting point.

The product acts as a weak acid and is soluble in a bicarbonate solution and in alkalis, wherefrom it may be re-precipitated by means of hydrochloric acid.

In animal tests the product of the invention reacts as follows:

When the product is administered per os to a rabbit in a dose of 5 milligrams per kilogram of weight of the rabbit, the decrease of the blood prothrombin starts already within a short while and reaches the lowest level in the average within 18 hours, the titre moving between 20 to 30% of the normal value, determined by Quick's method.

In the drawings annexed hereto, I have shown this result in comparison with the administration of the same dose however of methylene-bis-4-oxycoumarin.

In the drawings:

Fig. 1 shows the course of the prothrombin level in per cent of the normal value with time when methylene-bis-4-oxycoumarin is administered to a rabbit; whereas Fig. 2 shows the corresponding course of the prothrombin level on administration of the product of the invention.

Whereas in the case of Fig. 1, the normal prothrombin level will be reached only after 9 days, the normal level in the case of Fig. 2 is already restored after approximately 30 hours.

Histological tests of organs did not show any changes, solely an accumulation of glycogen in the tissue of the liver. Particularly, after administration during an extended period of time, no damage to the capillaries was observed, in contrast with the administration of methylene-bis-4-oxycoumarin where such damages have been observed.

The following example will illustrate the manufacture of the compounds of the invention. It will be readily understood however that this example is illustrative of the invention but not limitative of its scope.

*Example*

7 gm. of benzotetronic acid are dissolved in 750 cc. of water at boiling temperature and thereafter 7 gm. of glyoxylic acid ethyl ester are added. After a short while the liquid becomes turbid and gradually a white deposit is separated. The deposit is filtrated and dried in vacuo. The melting point is 172 to 174° C.; after recrystallization from methyl alcohol 153 to 154° C.

The crude product is dissolved in sodium lye, filtrated by means of animal charcoal, precipitated by means of hydrochloric acid, and recrystallized from methyl alcohol. Melting point 153 to 154° C.

I claim:

1. The process of manufacturing derivatives of benzotetronic acid which includes the step of condensing benzotetronic acid with glyoxylic acid ethyl ester.

2. The process as set forth in claim 1 which includes the step of condensing the reagents in the presence of a solvent.

3. The process of manufacturing derivatives of the benzotetronic acid which includes the steps of condensing benzotetronic acid with glyoxylic acid ethyl ester and purifying the condensation product by dissolving it in an alkali, precipitating it by means of an acid, and recrystallizing it.

4. As a new compound: 3,3'-carboxymethylenebis-(4-hydroxycoumarin) ethyl ester and having the structural formula:

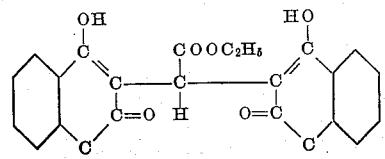

JAN ROSICKÝ.

REFERENCES CITED

The following references are of record in the file of this patent:

Sullivan et al., Journal of the Amer. Chem. Society, vol. 65, Dec. 1943, pp. 2288–2291.